US010410529B2

(12) United States Patent
Chiodini et al.

(10) Patent No.: US 10,410,529 B2
(45) Date of Patent: Sep. 10, 2019

(54) AUTOMATIC ASSISTANCE METHOD FOR LANDING AN AIRCRAFT

(71) Applicant: Safran Electronics & Defense, Boulogne-Billancourt (FR)

(72) Inventors: Alain Chiodini, Boulogne-Billancourt (FR); Sylvain Pouillard, Paris (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 81 days.

(21) Appl. No.: 15/558,992

(22) PCT Filed: Mar. 16, 2016

(86) PCT No.: PCT/EP2016/055736
§ 371 (c)(1),
(2) Date: Sep. 16, 2017

(87) PCT Pub. No.: WO2016/146713
PCT Pub. Date: Sep. 22, 2016

(65) Prior Publication Data
US 2018/0053428 A1 Feb. 22, 2018

(30) Foreign Application Priority Data
Mar. 16, 2015 (FR) ..................................... 15 00515

(51) Int. Cl.
G08G 5/02 (2006.01)
G05D 1/06 (2006.01)
(Continued)

(52) U.S. Cl.
CPC ........... *G08G 5/025* (2013.01); *G05D 1/0676* (2013.01); *G08G 5/0021* (2013.01);
(Continued)

(58) Field of Classification Search
CPC .................................................... G05D 1/0676
See application file for complete search history.

(56) References Cited

U.S. PATENT DOCUMENTS

2004/0267444 A1* 12/2004 Coatantiec ............. G01C 5/005
701/533
2009/0055038 A1* 2/2009 Garrec .................... G01S 11/10
701/17
(Continued)

FOREIGN PATENT DOCUMENTS

| FR | 2832796 | 5/2003 |
| FR | 2894347 | 6/2007 |
| FR | 3009117 | 1/2015 |

OTHER PUBLICATIONS

"French Preliminary Search Report," FR Application No. 1500515 (dated Jan. 28, 2016) (with English translation cover sheet).
(Continued)

*Primary Examiner* — Imran K Mustafa
(74) *Attorney, Agent, or Firm* — Womble Bond Dickinson (US) LLP

(57) ABSTRACT

The invention relates to an automatic assistance method for landing an aircraft on a landing runway, from a return point (A) to a completion point (PA) at which the aircraft comes into contact with the landing runway, implemented by a data-processing device on-board said aircraft and configured to be linked to an inertial unit, an altimeter and a deviation meter, said method comprising: —guidance, based on position and attitude data provided by the inertia unit and altitude data provided by the altimeter, of the aircraft along a predefined trajectory from the return point (A) to a predetermined holding point (C) approximately aligned with the axis of the landing runway, the guidance been performed over at least one part of said predefined trajectory on the basis of corrected position data calculated using position
(Continued)

data of the aircraft provided by the inertia unit and measurements transmitted by the deviation meter, —guidance from the holding point (C) to the completion point (PA).

13 Claims, 10 Drawing Sheets

(51) Int. Cl.
*G08G 5/00* (2006.01)
*G08G 5/06* (2006.01)

(52) U.S. Cl.
CPC ......... *G08G 5/0078* (2013.01); *G08G 5/0086* (2013.01); *G08G 5/065* (2013.01)

(56) References Cited

U.S. PATENT DOCUMENTS

2015/0153740 A1* 6/2015 Ben-Shachar ....... G05D 1/0676
  701/16
2016/0104384 A1* 4/2016 Hanel ................... G01S 13/02
  701/17

OTHER PUBLICATIONS

"International Search Report," PCT Application No. PCT/EP2016/055736 (dated Jul. 8, 2016) (with English translation cover sheet).

* cited by examiner

AUTOMATIC ASSISTANCE METHOD FOR LANDING AN AIRCRAFT

GENERAL TECHNICAL FIELD

The invention relates to the field of aircraft guidance.

It has as a more particular object an automatic guidance method for an aircraft such as a drone from a position distant from an airport until landing of the aircraft at a runway of the airport.

PRIOR ART

Guidance systems for existing drones allow the autonomous guidance of a drone along a predefined trajectory, corresponding for example to the trajectory of an observation mission. To accomplish such guidance, the position of the aircraft is determined at regular intervals and compared to the trajectory to be followed. This position is generally determined using a receiver of an absolute positioning system using satellites, such as GPS or Galileo systems.

It can however happen that the computer of the aircraft is incapable of determining the current position of the aircraft, either due to a failure of a component of the aircraft, such as a GPS receiver, or due to the unavailability of the positioning signal, for example in case it is jammed. Without knowing the position of the aircraft, the computer is then incapable of guiding the aircraft to cause it to follow the pre-determined trajectory. The guidance system of the aircraft is then, in particular, incapable of having it reach its intended landing point such as a runway of an airport. The aircraft then risks crashing at an unknown position and being lost.

To avoid this, the current position of the aircraft can be determined using another system that it carries onboard. For example, the computer of the aircraft can determine this position based on signals provided by the inertial unit of the aircraft constantly measuring linear and angular accelerations of the aircraft. An integration of the signals provided by this inertial unit makes it possible to determine the displacements of the aircraft and therefore to determine its relative position with respect to the last position provide by the satellite positioning system.

However, the determination of the position of the aircraft by such a method based on the integration of the signals of the inertial unit can have a high degree of uncertainty. The accumulation over time of the deviations between the movement determined by integration and the actual movement of the aircraft causes drifting of the determined position of the aircraft with respect to its true position. Such a drift can reach several kilometers per flight hour since the last position provided by the satellite positioning system. In the event of a failure in the satellite positioning taking place at a long distance from the intended landing point and causing guidance of the aircraft based on signals from the inertial unit over a long period, the guidance system can, due to this drift, lead the aircraft unknowingly to a position distant by several kilometers from the landing point. The aircraft will then be unable to know its true position, to find the intended airport for landing, and to set down.

There exists therefore a need for a guidance method allowing an aircraft to be guided safely, autonomously, from a distant return point to an airport and then have the aircraft land on a runway thereof, despite unavailability of satellite positioning and despite a marked drift of the current position of the aircraft determined based on signals from its inertial unit.

PRESENTATION OF THE INVENTION

The present invention relates, according to a first aspect, to an automatic assistance method for landing an aircraft on a landing runway from a return point to the culmination point at which the aircraft comes into contact with the landing runway, said method being implemented by a data processing device on board said aircraft and configured to be connected to:
  an inertial unit configured to estimate the position and the attitude of the aircraft,
  an altimeter configured to measure the altitude of the aircraft,
  a distance ruler configured to measure, with respect to a reference point, the azimuth of the aircraft with respect to a reference direction, said method being characterized in that it comprises:
  a return navigation assistance phase comprising guidance, based on position and attitude data provided by the inertial unit and altitude data provided by the altimeter, of the aircraft along a predefined trajectory from the return point to a predetermined connection point approximately aligned with the axis of the landing runway, guidance being achieved over at least a portion of said predefined trajectory based on corrected position data calculated using position data of the aircraft provided by the inertial unit and measurements transmitted by the distance ruler,
  a landing assistance phase comprising a guidance of the aircraft from the connection point to the culmination point.

The measurements transmitted by the distance ruler allow the position data of the inertial unit to be corrected to compensate for the drift thereof. The aircraft can thus be brought to the connection point C with reduced uncertainty allowing it to be safely landed.

The phase consisting of assistance with return navigation can comprise:
  a first step of guiding the aircraft along the redefined trajectory from the return point to the predetermined capture point, based on position and attitude data provided by the inertial unit and altitude data provided by the altimeter,
  a second step of guiding the aircraft along the predefined trajectory from the capture point to the connection point based on attitude data provided by the inertial unit, altitude data provided by the altimeter and corrected position data calculated using the aircraft position data provided by the inertial unit and azimuth measurements transmitted by the distance ruler, said predefined trajectory imposing a turning movement on the aircraft between the capture point B and the connection point.

The turning movement implemented between the capture point and the connection point makes it possible to reduce the uncertainty regarding the position of the aircraft linked with uncertainties and biases in the measurements of the distance ruler. The aircraft can thus be guided until the connection point with increased accuracy, guaranteeing good alignment of the aircraft with the landing runway.

The first step of guiding the return navigation assistance phase can comprise the guidance of the aircraft along the predefined trajectory from the return point to the capture point based on attitude data provided by the inertial unit, altitude data provided by the altimeter and corrected position data calculated using the aircraft position data provided by the inertial unit and azimuth measurements transmitted by the distance ruler.

The distance ruler measurements can also be used to compensate for the drift of the inertial unit starting at the return point, minimizing uncertainty regarding the position of the aircraft during guidance thereof toward the capture point.

In a first variant implementation, the predefined trajectory between the return point and the capture point is rectilinear.

A rectilinear trajectory allows the distance to be traveled between the return point and the capture point to be minimized, minimizing the return time and the consumption of resources on this portion of the return trajectory.

In a second variant implementation, the predefined trajectory between the return point and the capture point is a zigzag.

A zigzag trajectory allows the range of angular variation measured by the distance ruler to be varied more widely, and therefore to reduce the associated uncertainty, and the uncertainty regarding the position of the aircraft.

The data processing device being configured to also be connected to a camera on board the aircraft, the landing assistance phase can comprise the estimation of a position of the culmination point in an image of the landing runway captured by the camera and the estimation of a position of the aircraft depending on said position of the culmination point estimated in the image and altitude data provided by the altimeter.

The position of the aircraft can thus be determined throughout the landing with a lower uncertainty than if it were determined by the inertial unit and/or the distance ruler. This increased accuracy allows the aircraft to be safely guided between the connection point and the culmination point, and to land it.

The data processing device further being configured to be connected to a transceiver on board said aircraft and designed to receive signals emitted by at least three transceivers positioned on the ground, the landing assistance phase can comprise the estimation of corrected position data of the aircraft based on position data provided by the inertial unit, azimuth measurements transmitted by the distance ruler, distance data between the on-board transceiver and said at least three ground-based transceivers.

The use of information regarding distance between the aircraft and fixed points on the ground with known positions such as the ground-based transceivers makes it possible to reduce the uncertainty in the position of the aircraft determined based on the inertial unit and the distance ruler to as to accurately guide the aircraft to the culmination point.

According to a second aspect, the invention relates to a computer program product comprising code instructions for the execution of the method according to the first aspect when this program is executed by a processor.

According to a third aspect, the invention relates to a data processing device configured for implementing the assistance method according to the first aspect.

According to a fourth aspect, the invention relates to a system for automatic assistance with landing of an aircraft on a landing runway comprising:
    an inertial unit configured to estimate the position and the attitude of the aircraft,
    an altimeter configured to measure the altitude of the aircraft,
    a distance ruler configured to measure, with respect to a reference point, the azimuth of the aircraft with respect to a reference direction,
    the data processing device according to the third aspect.

Said assistance system according to the fourth aspect can also comprise a camera configured to be connected to the data processing device.

Said assistance system according to the fourth aspect can also comprise:
    at least three transceivers positioned on the ground;
    a transceiver designed to receive signals emitted by said at least three transceivers positioned on the ground, on board said aircraft and configured to be connected to the data processing device.

Such computer program products, data processing devices and systems have the same advantages as those mentioned for the method according to the first aspect.

PRESENTATION OF THE FIGURES

Other features and advantages will appear upon reading the description that follows of an embodiment. This description will be given with reference to the appended drawings wherein.

DETAILED DESCRIPTION

Figure 1:
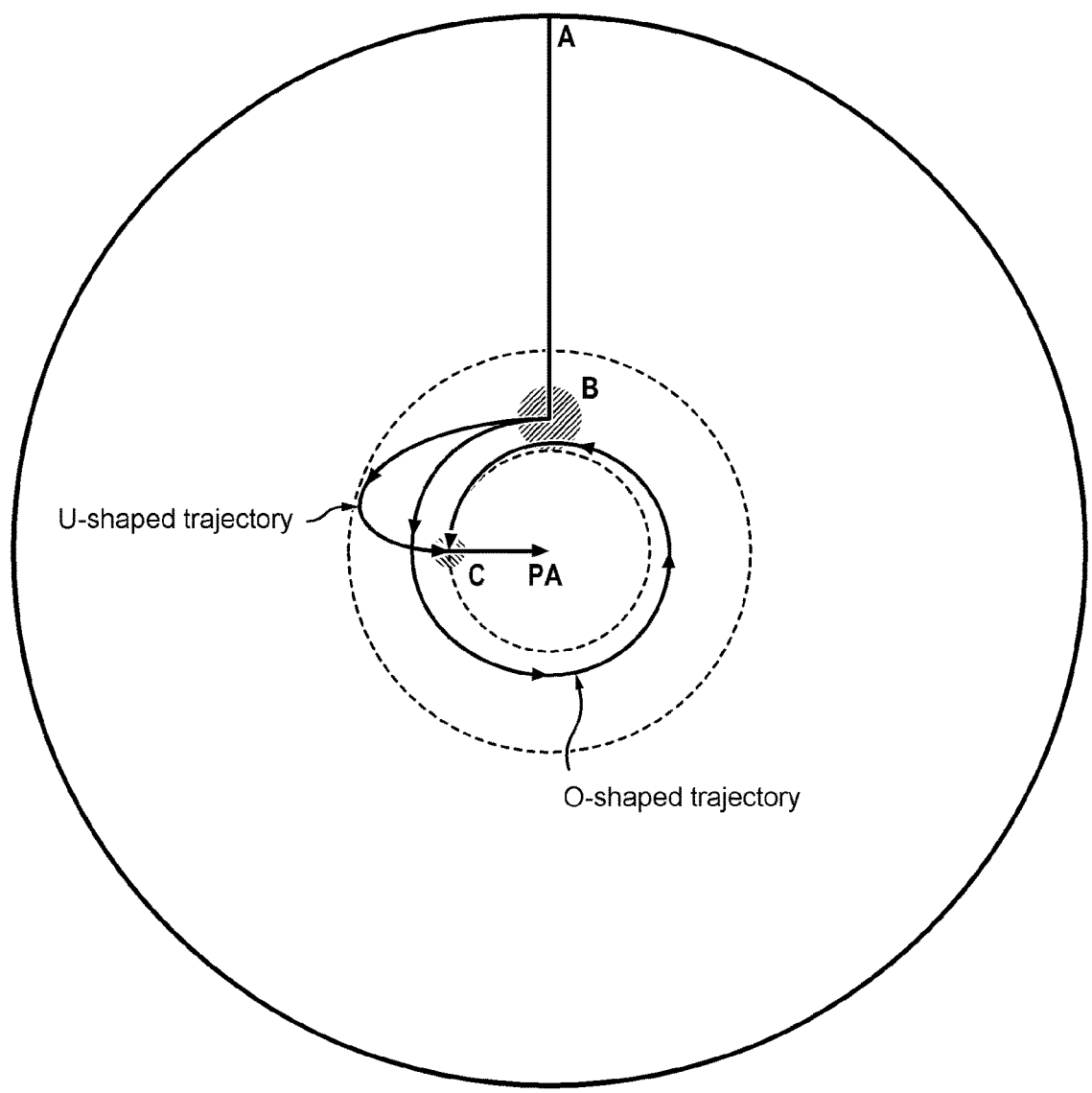
FIG. 1 illustrates schematically an example of guidance of an aircraft in landing on a landing runway from a return point A to a culmination point PA according to one embodiment of the invention.
Figure 2:
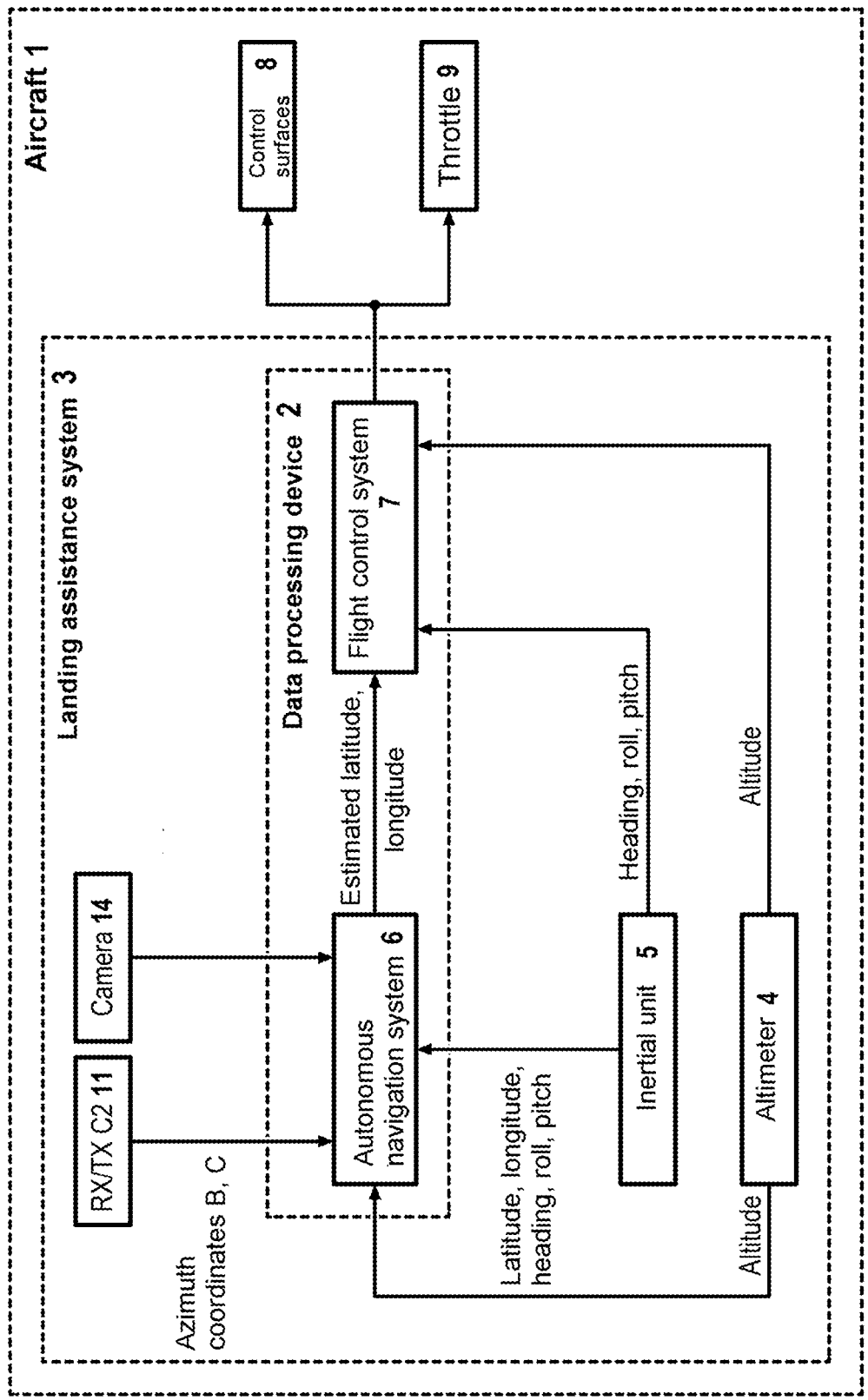
FIG. 2 illustrates a landing assistance system for an aircraft according to one embodiment of the invention.

One embodiment of the invention relates to an automatic assistance method for an aircraft 1 for landing on a landing runway from a return point A to a culmination point PA at which the aircraft comes into contact with the landing runway, as shown in FIG. 1. This method is implemented by a data processing device 2 of a landing assistance system 3 as shown in FIG. 2. The landing assistance system 3 can also comprise an altimeter 4 and an inertial unit 5 carried on board the aircraft and to which the data processing device can be connected.

The altimeter 4 can be a barometric altimeter or a laser altimeter. The barometric altimeter can have 10-meter accuracy and can be adjusted using the value of the atmospheric pressure QNH which is the barometric pressure corrected for instrumental, temperature and gravity errors and recalculated for mean seal level (MSL). In practice, the pressure QNH can be given by reference to the threshold of the landing runway, so that the altimeter displays the geographic altitude of the culmination point PA when the aircraft is positioned over the threshold of the runway in question. The laser altimeter can have 0.2-meter accuracy and be used when the altitude is less than 100 meters.

The inertial unit 5 is capable of integrating the movements of the aircraft (acceleration and angular velocity) to estimate its orientation (roll, pitch and heading angles), its linear speed and its position. It comprises accelerometers to measure the linear accelerations of the aircraft in three orthogonal directions and gyroscopes to measure the three components of the angular speed vector (roll, pitch and yaw rates). The inertial unit also provides the attitude of the aircraft (roll, pitch and heading angles).

This method proposes to safely guide and aircraft such as a drone or an airliner, autonomously, from a distant return point to a landing runway, for example that of an airport, and to have the aircraft land on this runway, despite an unavailability of the satellite positioning system and despite a marked deviation of the current position of the aircraft determined by its inertial unit 5, by correcting position data provided by this unit using complementary position data provided by a ground-based system.

For this purpose, the data processing device 2 is capable of being carried on board the machine and can include a computer and a communication interface. Such an on-board computer can consist of a processor or microprocessor, of the x-86 or RISC type for example, a controller or microcontroller, a DSP, an integrated circuit such as an ASIC or a programmable one such as an FPGA, a combination of such elements or any other combination of components allowing implementation of the calculation steps of the method described below. Such a communication interface can be any interface, analog or digital, allowing the computer to exchange information with other elements of the assistance system 3 such as the altimeter 4 and the inertial unit 5. Such an interface can for example be an RS232 series interface, a USB, Firewire, HDMI interface or a network interface of the Ethernet type.

As shown in FIG. 2, the computer of the data processing device 2 can be shared between an autonomous navigation system 6 and a flight control system (SCV) 7. The autonomous navigation system 6 can be instructed to estimate the latitude and the longitude of the position of the aircraft as well as the altitude during landing. The flight control system 7 can be instructed to proceed with the guidance of the aircraft depending on the latitude and longitude data provided by the autonomous navigation system 6, the altitude provided by the altimeter 4 and the aircraft attitude data, such as heading, roll and pitch, provided by the inertial unit 5. For this purpose, the flight control system can transmit set points to the control members of the aircraft such as the electric, hydraulic or hybrid actuators actuating the control surfaces 8 or the throttle lever 9.

Figure 3:
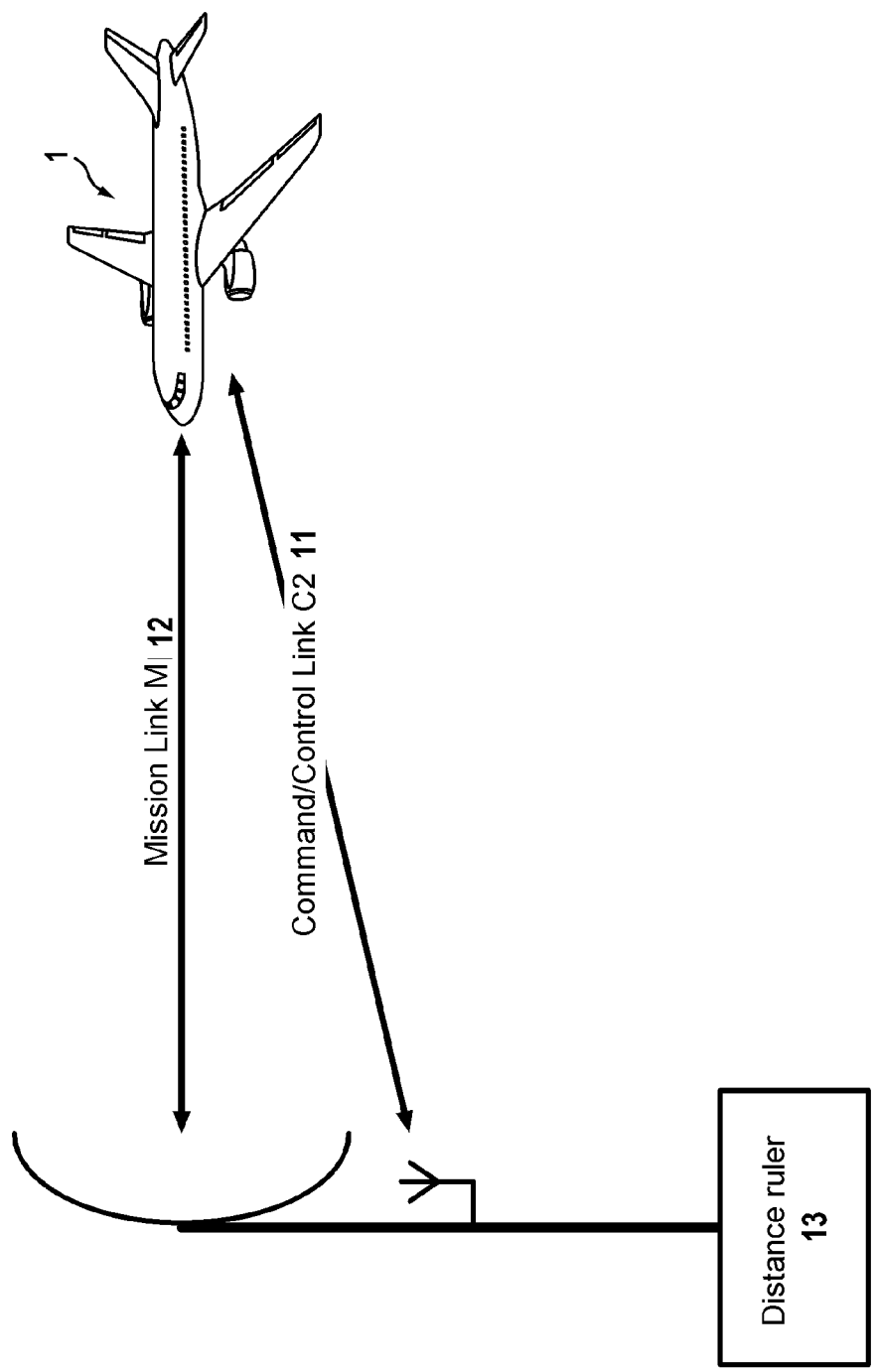
FIG. 3 illustrates the two radio links connecting the data processing device to a station on the ground as well as the distance ruler comprised in the landing assistance system according to the invention.

The data processing device 2 can be connected to a ground-based station, generally positioned in proximity to the airport or to the landing runway, via two links as shown in FIG. 3:
- one link 11 so-called "command/control" C2, by radio and bidirectional within a band of the electromagnetic spectrum comprised between 3 and 6 GHz which allows exchange of control and command messages between the ground station and the aircraft. The signals transmitted are modulated using a single carrier modulation and are transmitted/received by means of an omnidirectional antenna mounted on a masthead at the ground station;
- a mission data link 12 M, by radio and bidirectional within a band comprised between 10 and 15 GHz of the electromagnetic spectrum, which allows the exchange of a data feed generated by the different on-board sensors. The signals transmitted are modulated using a multi-carrier modulation and are transmitted/received by means of a directional antenna such as a parabola, mounted on a masthead.

The landing assistance system 3 also comprises a distance ruler 13. Such a distance ruler is a ground-based system, connected to a directional antenna of the grounds station used for the mission data link 12. The distance ruler is configured to continuously measure the direction of the aircraft, i.e. the azimuth of the aircraft with respect to a reference direction, north for example. The azimuth of the aircraft is measured with respect to a reference point, for example with respect to the position of the directional antenna mounted at the masthead. The distance ruler can measure this angle based on the orientation of the directional antenna provided by an electromechanical antenna positioning device configured to position the directional antenna in elevation and bearing so as to point it toward the aircraft to maximize the quality of the radio link. The distance ruler is configured to transmit the measured azimuth data to the data processing device through the command/control link 11.

The method proposes to use these azimuth data transmitted by the distance ruler and the aircraft position data provided by the inertial unit to calculate the corrected position data compensating for the drift of the inertial unit. These corrected position data can be used to guide the aircraft to a predetermined connection point C approximately aligned with the axis of the landing runway and located on the perimeter of a connection zone centered on the culmination point PA and with a pre-determined radius, as shown in FIG. 1. By way of an example, such a connection zone can have a radius less than or equal to 5 km.

The landing assistance system 3 can also comprise a supplementary positioning system dedicated to guiding the aircraft in a connection zone during a landing phase until the culmination point.

In a first embodiment shown in FIG. 2, the landing assistance system 3 comprises a camera 14 carried on board the aircraft to which the data processing device can be connected. Such a camera can be an infrared panoramic camera, of the SWIR (short wave infrared range, with a wavelength between 0.9 and 1.7 microns) type. The video feed acquired by the camera is transmitted, on the one hand, to the processing device 2 so as to locate the landing runway and to determine the position of the aircraft relative to it during landing, and on the other hand to the ground station by means of the mission data link.

Figure 4:
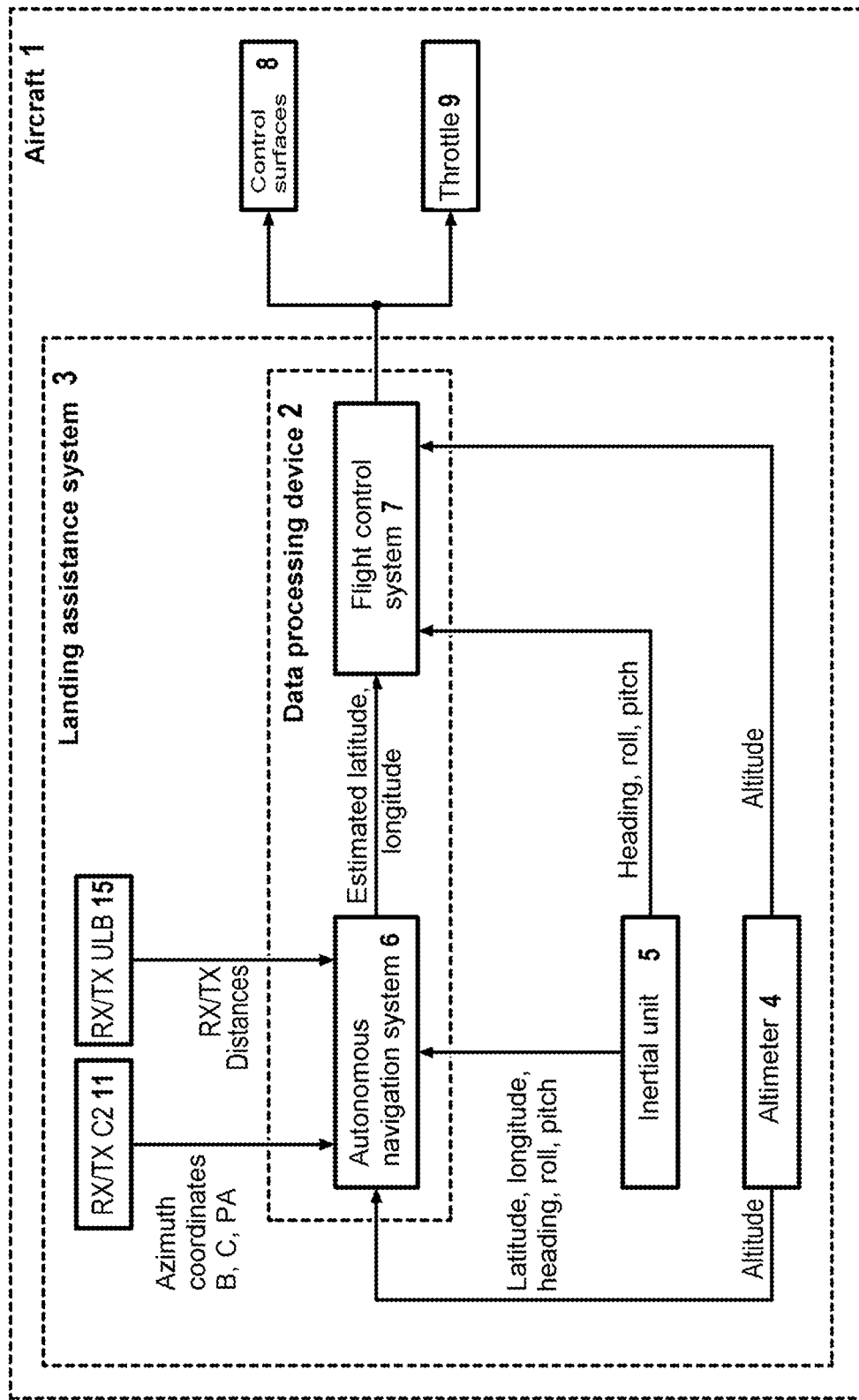
FIG. 4 illustrates a landing assistance system for an aircraft according to an embodiment of the invention.

In a second embodiment shown in FIG. 4, the landing assistance system 3 comprises at least three transceivers positioned on the ground and an on-board transceiver 15 on the aircraft and configured to be connected to the data processing device 2. Such transceivers can be UWB (ultra wide band) radio beacons. By exchanging signals with the ground-based transceivers, the on-board transmitter receiver is capable of determining the distance separating it from each of the ground-based transceivers, for example by measuring the back-and-forth transmission time of a signal. The on-board transceiver is also configured to transmit these distances to the processing device 2. Knowing the positions of the ground-based transceivers, the processing device 2 can then determine a corrected position of the aircraft based on the azimuth data transmitted by the distance ruler, the aircraft position data provided by the inertial unit, the distance data provided by the on-board transceiver.

The steps of the method are described in more detail in the following paragraphs, with reference to FIG. 5.

The method can comprise a phase of assistance with return navigation P1 during which the processing device performs guidance, based on position and attitude provided by the inertial unit 5 and altitude data provided by the altimeter 4, of the aircraft along a predefined trajectory from the return point A to the predetermined connection point C approximately aligned with the axis of the landing runway. To compensate for the drift in the position data provided by the inertial unit, guidance can be achieved over at least a portion of said predefined rout based on corrected position data calculated using position data of the aircraft supplied by the inertial unit and measurements transmitted by the distance ruler. According to one variant, the corrected position data can also be calculated depending on altitude data provided by the altimeter.

The method can also comprise a landing assistance phase P2 during which the processing device carries out guidance of the aircraft from the connection point C to the culmination point PA.

Figure 6:
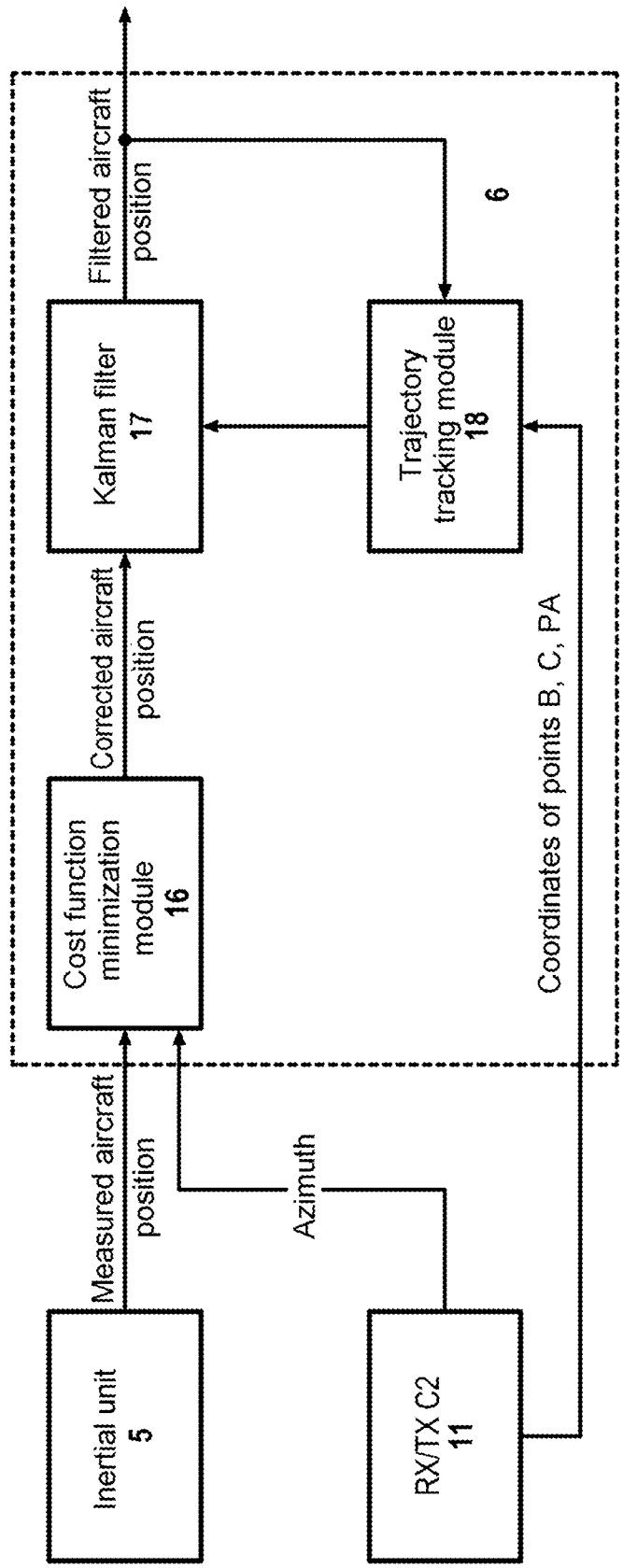
FIG. 6 is a diagram illustrating the calculation of corrected position data based on measurements transmitted by the distance ruler according to one embodiment of the invention.

The calculation of the corrected position data, involving measurements transmitted by the distance ruler, can be accomplished by a minimization module 16 minimizing a cost function as shown in FIG. 6. Such a cost function can be a mathematical expression comprising terms of deviation power between the true position coordinates of the aircraft and the corresponding coordinates provided by the inertial unit or the distance ruler. These powers can be chosen arbitrarily or selected so as to modulate or accentuate the relative importance of the contributions of one compared with the others. The desired corrected position coordinates are then the coordinates selected as real position coordinates minimizing the cost function according to the least "power" criterion. One example of a simple cost function C not taking into account the altitude measurements provided by the altimeter is provided below. This cost function comprises for example a term C1 which is a function of the position coordinates determined by the inertial unit and a term C2 which is a function of the azimuth measurement provided by the distance ruler.

$$C(x(t), y(t)) = \underbrace{C_1(x(t), y(t))}_{\text{inertial unit}} + \underbrace{C_2(x(t), y(t))}_{\text{distance ruler}}$$

The determination of the position of the aircraft being accomplished discretely, it is assumed in this example that it is carried out periodically with a sampling period T. At the instant t=kT $$C_1 * x(kT), y(kT)) = \sum_{m=0}^{k} \left( \frac{\sqrt{(x(mT) - x_I(mT))^2 + (y(mT) - y_I(mT))^2}}{\delta_{maxi}^{CI}(mT)} \right)^p$$

$$C_2(x(kT), y(kT)) = \sum_{m=0}^{k} \left( \frac{(\theta(mT) - \theta_e(mT))^2}{\sigma_e^2} \right)^q$$

Where:

(x(mT),y(mT)): Determined position of the aircraft at the instant mT.

($x_I$(mT),$y_I$(mT)): Position given by the inertial unit at the instant mT.

$\delta_{maxi}^{CI}$(mT): Maximum drift of the inertial unit at the instant mT.

p,q: Optional parameters allowing the cost function to conform progressively to a "rectangular well" (when p, q→∞).

θ(mT): Determined azimuth of the aircraft with respect to the reference direction at the instant mT.

$\theta_e$(mT): Measured azimuth of the aircraft with respect to the reference direction at the instant mT.

$\sigma_e$: Standard deviation of the measurement error committed by the distance ruler The angle θ(t) is linked to the coordinates (x(t),y(t)) in the following manner:

$$\theta(t) = \arg(x(t) + iy(t)) = Re(-i \log(x(t) + iy(t)))$$

where Re designates the real part.

The powers p,q can be modulated so as to vary the weight of each term in the function C depending on guidance step in progress, for example so as to reduce the importance of the inertial unit once past the capture point B.

The terms C1 and C2 given in the example are a function of the position data and the azimuth measurements provided at several instants mT before the instant kT for which the corrected position data x(t), y(t) are required. The position coordinates (x(mT),y(mT)), ($x_I$(mT),$y_I$(mT)) and the azimuth measurements θ(mT), $\theta_e$(mT) having already been determined or measured instants prior to t=kT, these terms are assumed to be known for m<k.

Minimizing C(x(t),y(t)) then amounts to minimizing:

$$\Gamma(k) = \left( \frac{\sqrt{(x(k) - x_I(k))^2 + (y(k) - y_I(k))^2}}{\delta_{maxi}^{CI}(k)} \right)^p + \left( \frac{(Re(-i\log(x(k) + iy(k))) - \theta_e(k))^2}{\sigma_e^2} \right)^q$$

The solution is obtained by solving the following system of equations:

$$\begin{cases} \frac{\partial \Gamma}{\partial x} = f_x = 0 \\ \frac{\partial \Gamma}{\partial y} = f_y = 0 \end{cases}$$

This system can be solved by any method known to a Person Skilled in the Art, for example by the iterative Newton-Raphson method. For this purpose, the following vector F and Jacobian matrix J are formed:

$$F_n = \begin{pmatrix} f_x \\ f_y \end{pmatrix}$$

$$J_n = \begin{pmatrix} \frac{\partial f_x}{\partial x} & \frac{\partial f_x}{\partial y} \\ \frac{\partial f_y}{\partial x} & \frac{\partial f_y}{\partial y} \end{pmatrix}$$

Where n designates the current iteration index.
The solution is determined iteratively as follows:

$$position_n = position_{n-1} - J_{n-1}^{-1} F_{n-1}$$

The initial position allowing the above equation to be initiated is given by the filter after the previous filtering iteration.
If the matrix J is poorly conditioned, it is possible to proceed with a Tikhonov regularization.

The corrected position data (x(t), y(t)) obtained by minimization of the cost function can be filtered using a Kalman filter 17 so as to refine the estimate of the position of the aircraft before using this position to accomplish guidance of the aircraft. To improve the effectiveness of this filtering, the processing device can comprise a trajectory tracking module 18 designed to modify the state matrix of the filter to take into account the predefined trajectory profile to have the aircraft follow. For this purpose, the trajectory tracking module can obtain this predefined trajectory from the ground station by means of the command/control link 11.

Such compensation of the drift of the inertial unit of the aircraft using measurements provided by the distance ruler allows the assistance system to improve its knowledge of the position of the aircraft despite the unavailability of satellite positioning and despite the drift of the inertial unit. Despite this, the corrected position data determined remain subject to the uncertainties and measurement bias of the distance ruler. Such a bias and uncertainty regarding the azimuth measured can be as high as half a degree, which can represent a considerable error in the position of the aircraft when it is at a long distance from the culmination point PA.

To minimize the error in the position of the aircraft due to bias and measurement uncertainty of the distance ruler, the navigation assistance phase P1 can comprise a first step of guiding E1 the aircraft along the predefined trajectory from the return point A to a predetermined capture point B. The navigation assistance phase P1 can also comprise a second step of guiding E2 the aircraft along the predefined trajectory from the capture point B to the connection point C, said predefined trajectory imposing a turning movement on the aircraft between the capture point B and the connection point C. The turning movement can in particular be carried out around the reference point with respect to which the measurements of the distance ruler are taken. During this second guidance step E2, guidance of the aircraft can be accomplished based on attitude data provided by the inertial unit, altitude data provided by the altimeter and corrected position data calculated using the aircraft position data provided by the inertial unit and the azimuth measurements transmitted by the distance ruler.

The implementation of such a turning movement allows the position of the directional antenna of the ground-based station to be varied and thus to modify the angular measurements provided by the distance ruler. This allows a reduction in the error in the position of the aircraft estimated based on position data of the inertial unit and the measurements of the distance ruler. By way of an example, the predetermined trajectory is selected so that the angular sweep of the aircraft with respect to the ground-based station is greater than 90°. Such a turning movement is implemented within the capture zone, shown in FIG. 1, in the form of a ring centered on the culmination point PA and surrounding the connection zone. By way of an example, the maximum radius of the capture zone can be less than or equal to 10 km. The ring surrounding the connection zone and comprising the return point A is called the return navigation zone and can extend to a distance of 150 km from the culmination point.

The capture point B from which the turning movement is implemented can be selected so that the real position of the aircraft is certainly situated in the capture zone when the processing device estimates that the aircraft is positioned at the capture point B, despite the error in the position of the aircraft resulting from the drift of the inertial unit and the uncertainty of the measurements of the distance ruler.

By way of an example, as shown in FIG. 1, the trajectory selected between the capture point B and the connection point C can be a U-shaped trajectory. Alternatively, said trajectory can be an O-shaped trajectory, or a spiral, causing an angular sweep of the aircraft with respect to the ground-based station potentially greater than 360°. The aircraft then makes more than one full turn around the ground-based station before reaching the connection point.

Figure 7:
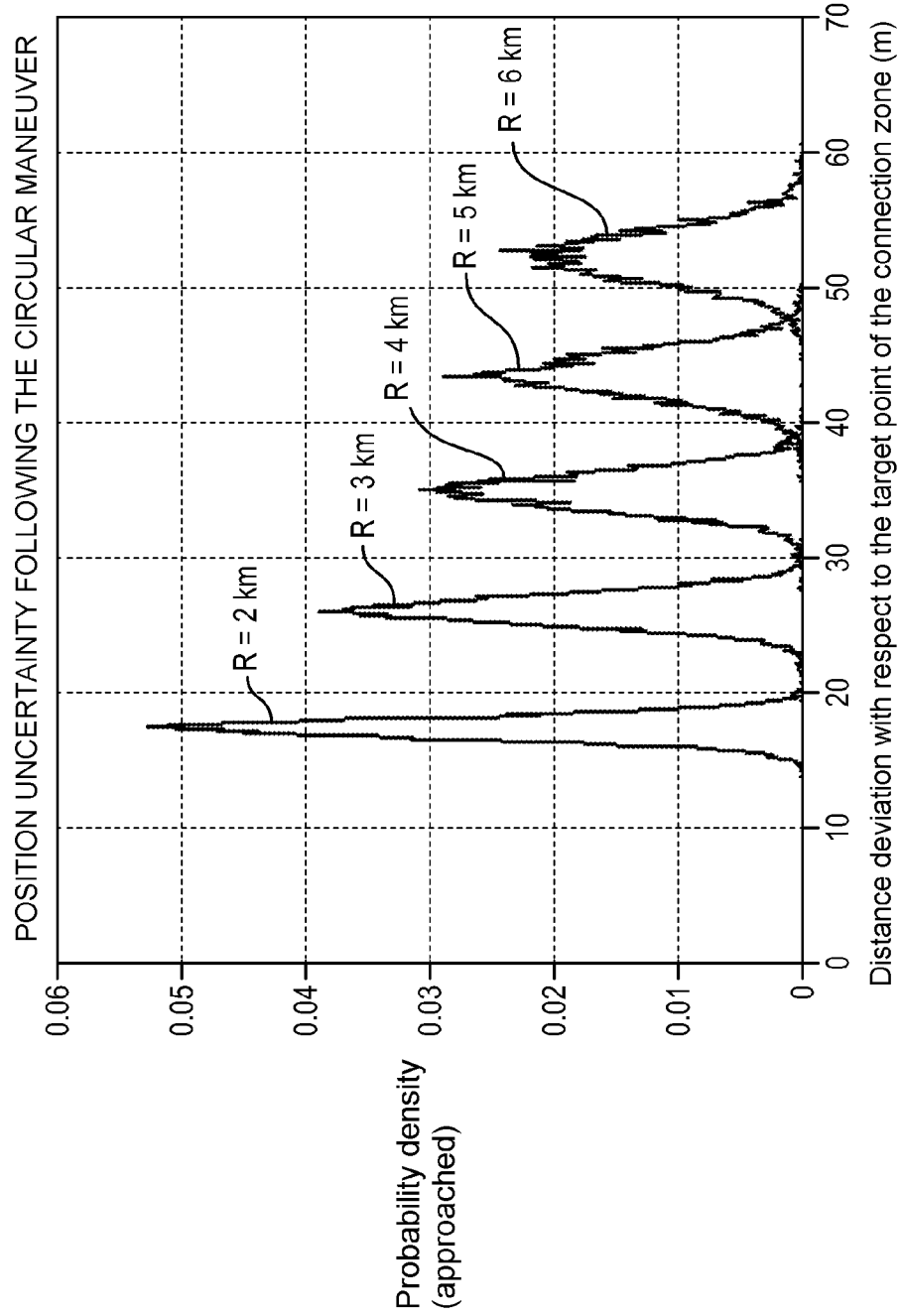
FIG. 7 is a diagram showing schematically the deviation between the position of the aircraft and the connection point following the turning movement of the aircraft as a function of the radius of curvature.

The residual uncertainty in the position of the aircraft is smaller, the smaller the radius of curvature of the turning movement, as shown in FIG. 7. The turning movement can then be preferably implemented with the smallest possible radius of curvature, less than 5 km for example, perhaps less than or equal to 2 km.

During this first guidance step E1, guidance of the aircraft can be accomplished solely based on position and attitude data provided by the inertial unit and altitude data provided by the altimeter. The position data of the aircraft are not then recalculated using the measurements of the distance ruler between the return point A and the capture point B. Alternatively, during this first guidance phase E1, guidance of the aircraft can be accomplished based on attitude data provided by the inertial unit, altitude data provided by the altimeter and corrected position data calculated using the aircraft position data provided by the inertial unit and azimuth measurements transmitted by the distance ruler. The position data of the aircraft are then recalculated using the measurements of the distance ruler from the return point A to the connection point C.

During this first guidance step E1, the predefined trajectory followed by the aircraft between the return point A and the capture point B can be rectilinear, thus minimizing the distance traveled and the energy consumed to arrive at the capture point B.

Alternatively, when the first step of guiding E1 comprises guidance of the aircraft based on corrected position data, i.e. when the measurements of the distance ruler are already employed between the return point A and the capture point B to compensate for the drift of the inertial unit, the predefined trajectory followed by the aircraft between the return point A and the capture point B can be a zigzag. Such a trajectory thus allows the orientation of the directional antenna of the ground-based station to be slightly varied, therefore reducing the uncertainty regarding the position of the aircraft prior to the implementation of the turning movement.

The steps described above allow compensation of the drift of the inertial unit and obtaining the position of the aircraft with an accuracy typically on the order of approximately fifty meters or less, sufficient to have the aircraft arrive in the alignment of the runway to the connection point C. However, the accuracy obtained can prove insufficient for guiding the aircraft to the culmination point and have it land on the landing runway. With a positioning uncertainty on the order of 50 m, the aircraft risks being guided alongside the runway. It can therefore be desirable to obtain the position of the aircraft with increased accuracy, guaranteeing a safe landing.

In a first embodiment, the aircraft is guided from the connection point C to the culmination point PA based on attitude data provided by the inertial unit, altitude data provided by the altimeter, and corrected position data calculated using the aircraft position data provided by the inertial unit and azimuth measurements transmitted by the distance ruler, as in the second guidance step E2.

Figure 5:
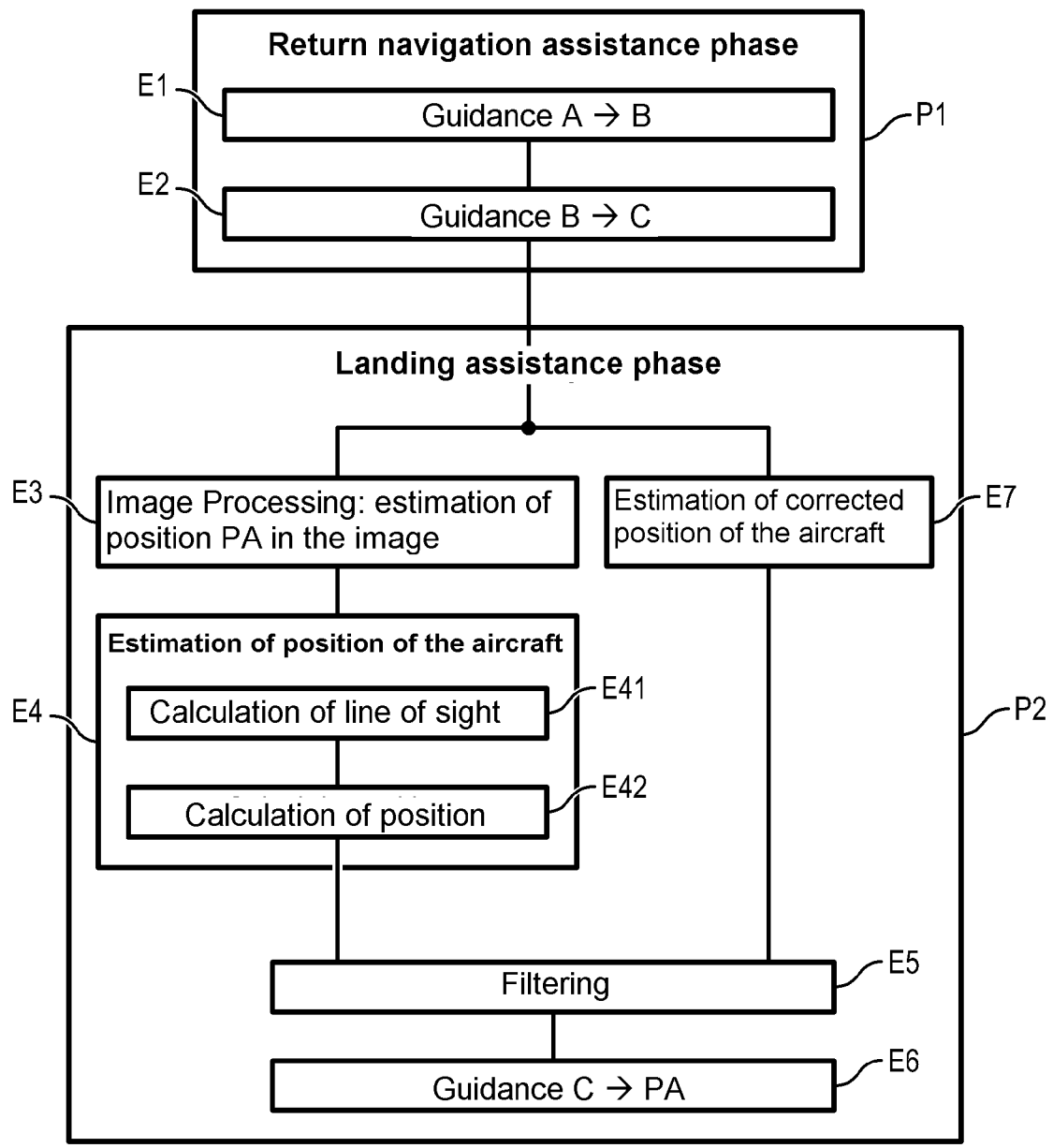
FIG. 5 is a diagram showing schematically an exemplary embodiment of the method of automatic landing assistance for an aircraft according to the invention.
Figure 8:
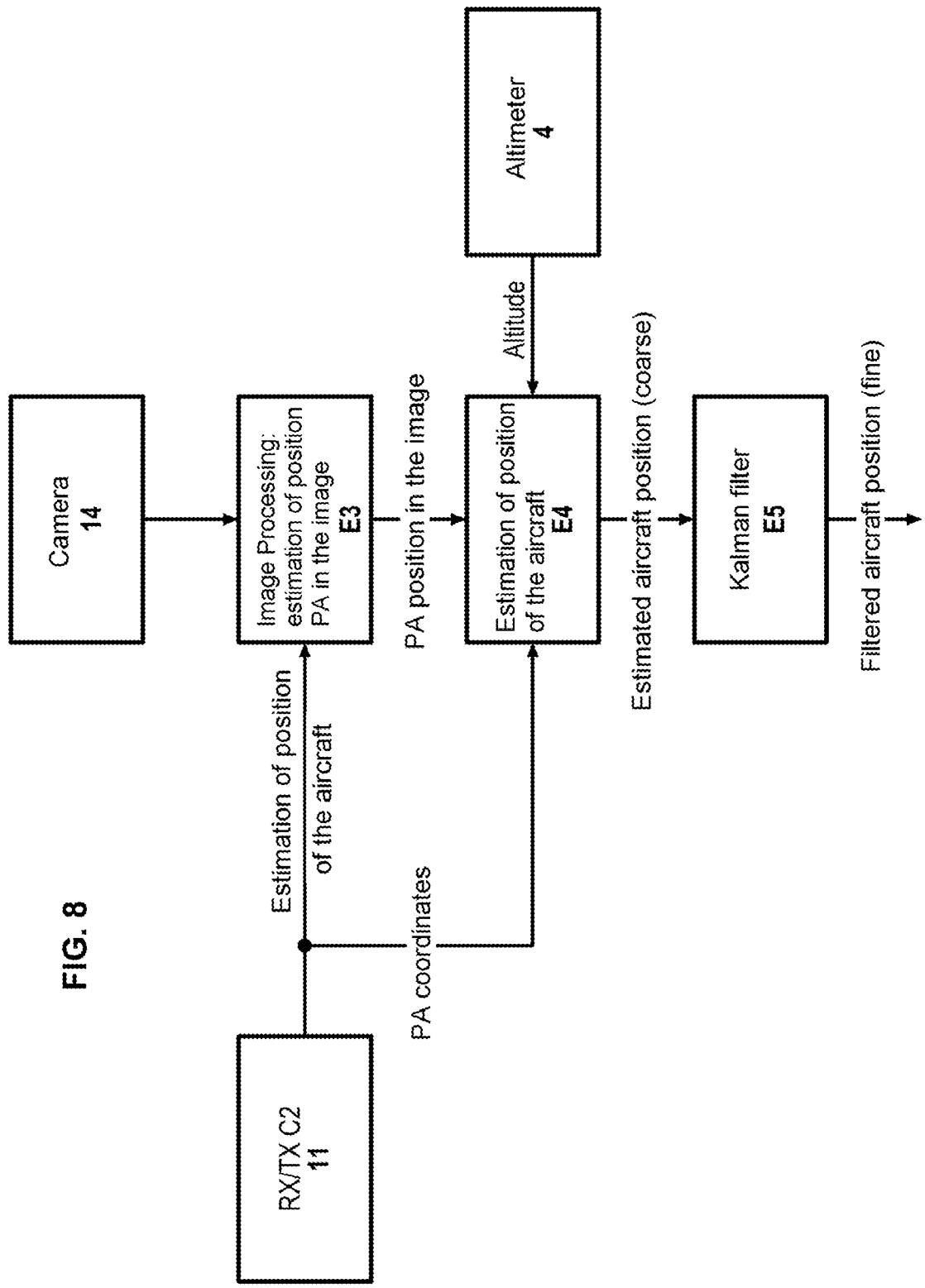
FIG. 8 illustrates the landing assistance phase according to the invention when the assistance system is equipped with a camera.

In a second embodiment, shown in FIG. 5 and in FIG. 8, the landing assistance phase P2, during which the aircraft is guided from the connection point C to the culmination point PA, can make use of images of the landing runway and of the culmination point PA supplied by the camera 14 carried on board the aircraft. For this purpose, the landing assistance phase P2 can comprise a step of image processing E3 during which the position of the culmination point PA is estimated in an image of the landing runway captured by the camera. This step can be implemented repetitively along the approach of the aircraft toward the runway, and its landing.

This detection of the culmination point in an image can be entirely automatic if the culmination point is easily detectable in the image, for example of the culmination point is embodied on the landing runway by a location on the ground, or if the runway itself is located by the presence on the ground of one or more reference points such as markings or lights. The position of the culmination point in the image can then be determined by known pattern or image recognition techniques.

Figure 9:
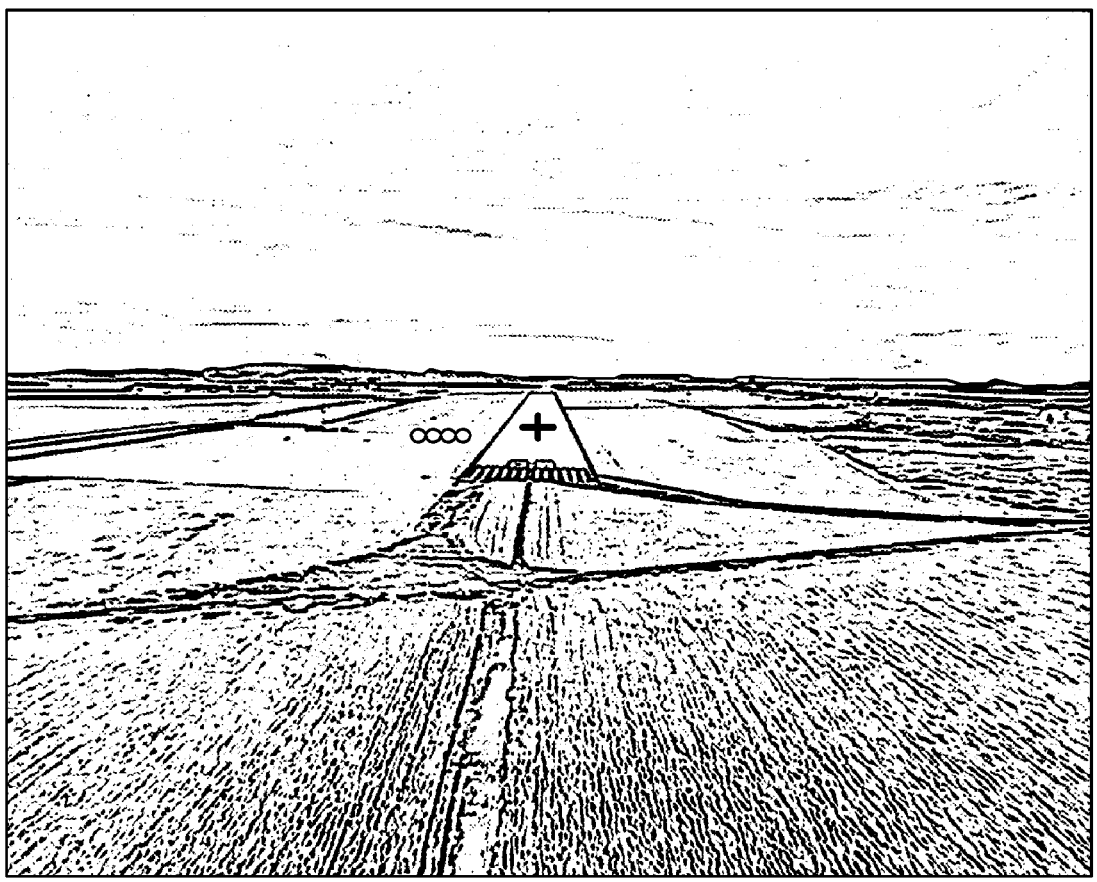
FIG. 9 illustrates the positioning of a reticle in an image on the culmination point.

Alternatively, the position of the culmination point in an image can be specified by a human operator in a first image, through the command/control link 11, for example by positioning a sighting reticle in the image on the culmination point as shown in FIG. 9. Then, the processing device can provide tracking of the position of the culmination point pointed out by the reticle in the images supplied later by the on-board camera, and automatically adjust the position of the reticle to maintain it centered on the culmination point. Such manual initiation of tracking can be necessary when the marking of the landing runway or of the culmination point is not sufficient for automatic detection, or when flight conditions (night flight, rain, fog . . . ) do not allow automatic detection. If necessary, the operator can correct the tracking of the position by manually adjusting the position of the reticle in the current image once or twice so that the reticle remains properly positioned on the culmination point in the successive images processed. To facilitate automatic tracking of the position of the culmination point, infrared light sources can be arranged on either side of the landing runway at the culmination point.

The landing assistance phase P2 can also comprise a first step of determining position E4, during which the position of the aircraft is estimated depending on the position of the culmination point estimated in the image during the image processing step E3. This estimate also requires altitude data of the aircraft provided by the altimeter and the coordinates of the culmination point which can be provided by the ground station through the command/control link 11. Following the first step of determining position E4, the processing device has a position for the aircraft, for example in the form of longitude and latitude. This position can then be employed to accomplish guidance of the aircraft until its landing at the culmination point PA during a third guidance step E6. As during the assistance phase P1, the position data of the aircraft obtained following the first step of position determination E4 can be filtered using a Kalman filter during a filtration step E5 so as to refine the estimate of the position of the aircraft prior to using this position to accomplish guidance of the aircraft during the third guidance step E6.

One non-limiting example of an implementation mode of the first position determination step E4 will be given in the following paragraphs. Alternatively, other implementation modes well-known to a Person Skilled in the Art could be implemented. As shown in FIG. 5, the first position determination step E4 can comprise a step of calculating a sight line E41 during which the sight line of the aircraft to the culmination point PA is determined in the centered terrestrial frame of reference.

This determination can be accomplished based on:
($PA_L$, $PA_G$, $PA_z$) the position of the culmination point PA supplied by the ground station,
($PA_H$, $PA_v$) the abscissa and ordinate of the culmination point pointed to by the reticle in the image from the on-board camera obtained following the image processing step E3, for example with respect to the upper left corner of the image
($C\varphi$, $C\theta$, $C\psi$) the positioning angles of the on-board camera in a frame of reference connected to the aircraft,
($C_{AOH}$, $C_{AOV}$) the horizontal and vertical opening angles of the camera,
($C_{RH}$, $C_{RV}$) the horizontal and vertical resolutions of the camera,
($A\varphi$, $A\theta$, $A\psi$) the roll, pitch and heading angles of the aircraft provided by the inertial unit,
$A_Z$ the altitude of the aircraft provided by the altimeter.
Also denoted are:
$C_{azimuth}$ and $C_{elevation}$ the azimuth and elevation of the aircraft in the frame of reference of the camera
RT the radius of the earth
$V_x$: vector associated with the sight line in the camera frame of reference
$V_y$: vector associated with the $1^{st}$ normal to the sight line in the camera frame of reference
$V_z$: vector associated with the $2^{nd}$ normal to the sight line in the camera frame of reference
$W_x$: vector associated with the sight line in the centered terrestrial frame of reference
$W_y$: vector associated with the $1^{st}$ normal to the sight line in the centered terrestrial frame of reference
$W_z$: vector associated with the $2^{nd}$ normal to the sight line in the centered terrestrial frame of reference The sight line calculation step E41 can then comprise the following operations:
Determination of the elementary angle associated with a pixel $$A_H = \frac{C_{AOH}}{C_{RH}}$$

$$A_V = \frac{C_{AOV}}{C_{RV}}$$

Determination of the angular position of the sight line with respect to the axis of the camera, $$C_{azimuth} = PA_H \cdot A_H - \frac{C_{AOH}}{2}$$

$$C_{elevation} = PA_V \cdot A_V - \frac{C_{AOV}}{2}$$

Determination of the sight line in the frame of reference of the camera:

Vector associated with the sight line toward the culmination point:

$$V_x = \begin{pmatrix} \cos(C_{azimuth})\cos(C_{elevation}) \\ \sin(C_{azimuth})\cos(C_{elevation}) \\ \sin(C_{elevation}) \end{pmatrix}$$

Vector associated with the first normal to the sight line toward the culmination point:

$$V_y = \begin{pmatrix} -\sin(C_{azimuth}) \\ \cos(C_{azimuth}) \\ 0 \end{pmatrix}$$

Vector associated with the second normal to the sight line toward the culmination point:

$$V_z = V_x \wedge V_y$$

Constitution of a transition matrix from the frame of reference of the camera to the frame of reference of the aircraft:

$$MP_{C \to A} = \begin{pmatrix} \cos(C_\theta)\cos(C_\psi) & \begin{matrix} \sin(C_\theta)\sin(C_\varphi)\cos(C_\psi) - \\ \sin(C_\psi)\cos(C_\varphi) \end{matrix} & \begin{matrix} \cos(C_\psi)\sin(C_\theta)\cos(C_\varphi) + \\ \sin(C_\varphi)\sin(C_\psi) \end{matrix} \\ \cos(C_\theta)\sin(C_\psi) & \begin{matrix} \sin(C_\theta)\sin(C_\varphi)\sin(C_\psi) + \\ \cos(C_\psi)\cos(C_\varphi) \end{matrix} & \begin{matrix} \sin(C_\theta)\cos(C_\varphi)\sin(C_\psi) - \\ \sin(C_\varphi)\cos(C_\psi) \end{matrix} \\ -\sin(C_\theta) & \cos(C_\theta)\sin(C_\varphi) & \cos(C_\theta)\cos(C_\varphi) \end{pmatrix}$$

Constitution of a transition matrix from the aircraft frame of reference to the local terrestrial frame of reference of the culmination point:

$$MP_{A \to RTL} = \begin{pmatrix} \cos(A_\theta)\cos(A_\psi) & \begin{matrix} \sin(A_\theta)\sin(A_\varphi)\cos(A_\psi) - \\ \sin(A_\psi)\cos(A_\varphi) \end{matrix} & \begin{matrix} \cos(A_\psi)\sin(A_\theta)\cos(A_\varphi) + \\ \sin(A_\varphi)\sin(A_\psi) \end{matrix} \\ \cos(A_\theta)\sin(A_\psi) & \begin{matrix} \sin(A_\theta)\sin(A_\varphi)\sin(A_\psi) + \\ \cos(A_\psi)\cos(A_\varphi) \end{matrix} & \begin{matrix} \sin(A_\theta)\cos(A_\varphi)\sin(A_\psi) - \\ \sin(A_\varphi)\cos(A_\psi) \end{matrix} \\ -\sin(A_\theta) & \cos(A_\theta)\sin(A_\varphi) & \cos(A_\theta)\cos(A_\varphi) \end{pmatrix}$$

Constitution of a transition matrix from the local terrestrial frame of reference of the culmination point to the centered terrestrial frame of reference:

$$MP_{RTL \to RTC} = (x_t \quad y_t \quad -u_t)$$

$$u_t = \begin{pmatrix} \cos(PA_L)\cos(PA_G) \\ \cos(PA_L)\sin(PA_G) \\ \sin(PA_L) \end{pmatrix}$$

$$y_t = \frac{\begin{pmatrix} 0 \\ 0 \\ 1 \end{pmatrix} \wedge u_t}{\left\| \begin{pmatrix} 0 \\ 0 \\ 1 \end{pmatrix} \wedge u_t \right\|} = \frac{1}{|\cos(PA_L)|} \begin{pmatrix} -\cos(PA_L)\sin(PA_G) \\ \cos(PA_L)\cos(PA_G) \\ 0 \end{pmatrix}$$

$$x_t = u_t \wedge y_t = \frac{1}{|\cos(PA_L)|} \begin{pmatrix} -\sin(PA_L)\cos(PA_L)\cos(PA_G) \\ -\sin(PA_L)\cos(PA_L)\sin(PA_G) \\ (\cos(PA_L))^2 \end{pmatrix}$$

Calculation of the transition matrix from the camera frame of reference to the centered terrestrial frame of reference:

$$MP_{C \to RTC} = MP_{RTL \to RTC} \cdot MP_{A \to RTL} \cdot MP_{C \to A}$$

Determination of the sight line ($W_x$, $W_y$, $W_z$) in the centered terrestrial frame of reference.

Vector associated with the sight line in the centered terrestrial frame of reference:

$$W_x = MP_{C \to RTC} \cdot V_x$$

Vector associated with the $1^{st}$ normal to the sight line toward the culmination point:

$$W_y = MP_{C \to RTC} \cdot V_y$$

Vector associated with the $2^{nd}$ normal to the sight line toward the culmination point:

$$W_z = MP_{C \to RTC} \cdot V_z$$

The first position determination step E4 can then comprise a position calculation step E42 during which:
the following equations are solved:
of the plane having as its normal $u_t$ tangent to the point resulting from the projection of the culmination point to the altitude of the aircraft,
of the plane generated by ($W_x$, $W_z$), with normal $W_y$ and running through ($PA_L$, $PA_G$, $PA_Z$),
of the plane generated by ($W_x$, $W_y$), with normal $W_z$ and running through ($PA_L$, $PA_G$, $PA_Z$),
the coordinates of the aircraft are determined in the centered terrestrial frame of reference.

They correspond to the point of intersection of these three planes:

The solution X is obtained by solving the linear system $MX=A$ when $u_t^T W_x < 0$.

With:

$$M = \begin{pmatrix} u_t^T \\ W_y^T \\ W_z^T \end{pmatrix}$$

$$A = (R_T + A_Z) \begin{pmatrix} u_t^T u_t \\ u_t^T W_y \\ u_t^T W_z \end{pmatrix}$$

The solution of the above linear system is:

$$X = \begin{pmatrix} x_1 \\ x_2 \\ x_3 \end{pmatrix} = M^{-1}A$$

The latitude and the longitude are then given by:

$$L = \sin^{-1}\left(\frac{x_3}{\|X\|}\right)$$

$$G = \arg(x_1 + ix_2)$$

Figure 10:
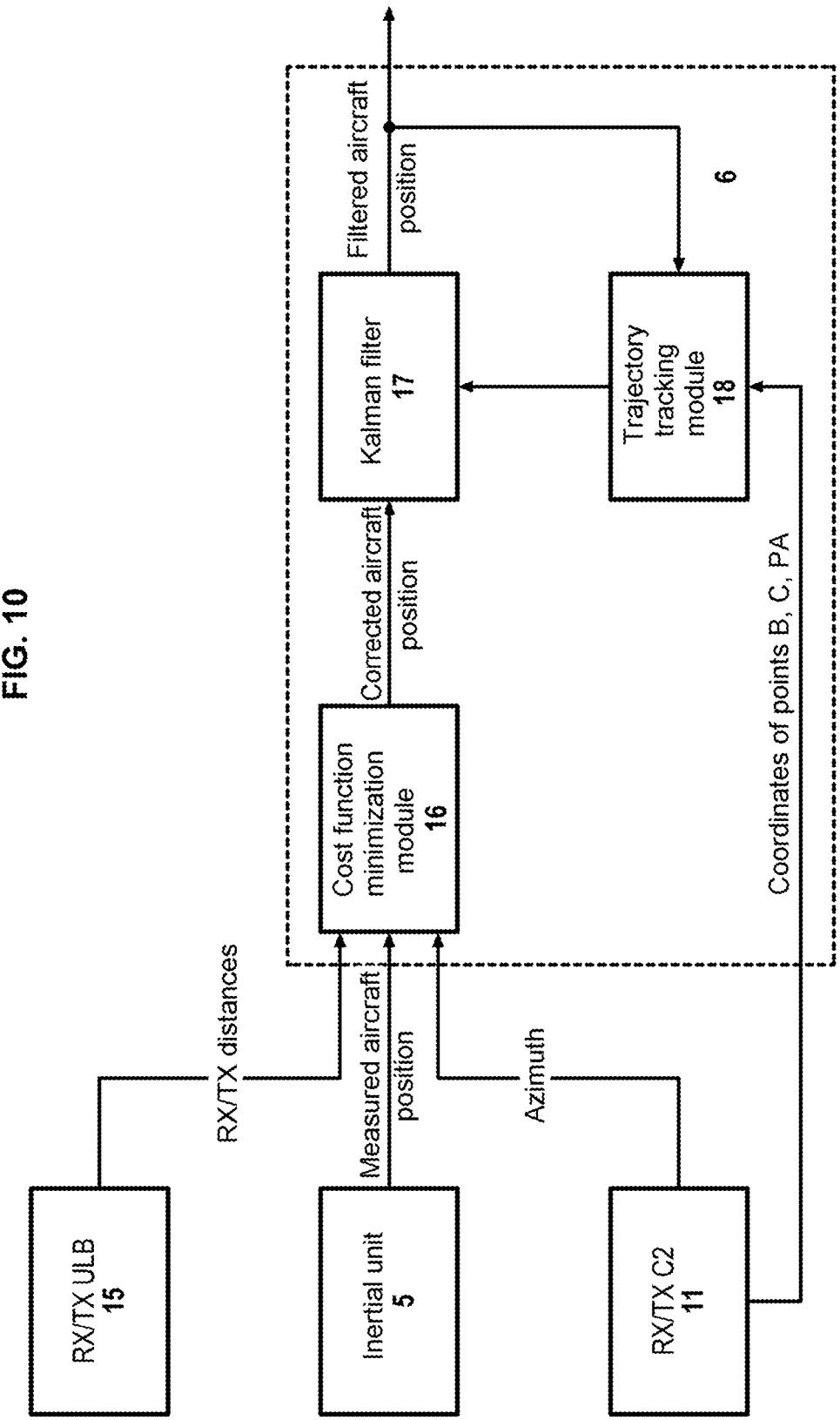
FIG. 10 is a diagram illustrating the calculation of corrected position data based on measurements transmitted by the distance ruler according to one embodiment of the invention.

In a third embodiment, shown in FIG. 5 and in FIG. 10, the landing assistance phase P2, during which the aircraft is guided from the connection point C to the culmination point PA, can use the distance data between a transceiver on board the aircraft and at least three transceivers on the ground. For this purpose, the landing assistance phase P2 can comprise a second position determination step E7 during which the corrected position data of the aircraft are estimated based on position data provided by the inertial unit, azimuth measurements transmitted by the distance ruler, distance data between the on-board transceiver and said at least three transceivers on the ground. As explained above, the distance between each transceiver on the ground and the on-board transceiver can be determined by exchange of signals between these transmitters. Because the position of the transceivers on the ground is known, these distance information can be employed to minimize uncertainty regarding the position of the aircraft.

For this purpose, the calculation of the corrected position data involving the measurements transmitted by the distance ruler and the distances between transceivers (ER) can be accomplished by a minimization module 16 minimizing a cost function, in a manner similar to the minimization of a cost function accomplished during the return navigation assistance phase P1 and described above. One example of a simple cost function C is provided below. This cost function comprises for example a term C1 which is a function of the distance data between the on-board transceiver and the transceivers on the ground, a term C2 which is a function of the position data determined by the inertial unit and a term C3 which is a function of the azimuth measurement provided by the distance ruler.

$$C(x(t), y(t)) = \underbrace{C_1(x(t), y(t))}_{ER\ ULB} + \underbrace{C_2(x(t), y(t))}_{inertial\ unit} + \underbrace{C_3(x(t), y(t))}_{distance\ ruler}$$

The determination of the position of the aircraft being carried out discretely, it is assumed in this example that it is carried out periodically with a sampling period T. At the instant t=kT.

$$C_1(x(kT), y(kT)) = \sum_{m=0}^{k} \sum_{n=1}^{N} w_n(mT)$$

$$\left(\frac{\sqrt{(x(mT)-x_n)^2 + (y(mT)-y_n)^2} - \sqrt{d_n^2(mT) - A_Z^2(mT)}}{\delta_{maxi}^{CI}(mT)}\right)^o$$

-continued $$C_2(x(kT), y(kT)) = \sum_{m=0}^{k} \left(\frac{\sqrt{(x(mT)-x_I(mT))^2 + (y(mT)-y_I(mT))^2}}{\delta_{maxi}^{CI}(mT)}\right)^p$$

$$C_3(x(kT), y(kT)) = \sum_{m=0}^{k} \left(\frac{(\theta(mT) - \theta_e(mT))^2}{\sigma_e^2}\right)^q$$

Where:
(x(mT),y(mT)): Determined position of the aircraft at the instant mT
($x_n$,$y_n$): Position of the ground-based transmitter/receiver (ER ULB) with index n
$A_Z$(mT): Altitude of the aircraft measured by the altimeter at the instant t=mT
N: Number of ER ULB deployed on the ground (N≥3)
$d_n(\tau)$: Measurement of the distance between the aircraft and the ER ULB on the ground with index n at instant $\tau$
$\delta_{maxi}^{ULB}(\tau)$: Maximum distance error committed during the distance measuring process
$w_n(\tau)$: 1 if distance measurement is possible (the ER on the ground is within range of the on-board ER), 0 otherwise.
($x_I$(mT),$y_I$(mT)): Position given by the inertial unit at the instant mT.
$\delta_{maxi}^{CI}$(mT): Maximum drift of the inertial unit at the instant mT.
o, p, q: Optional parameters allowing the cost function to be progressively conformed to a "rectangular well" (when o, p, q→∞).
θ(mT): Determined azimuth of the aircraft with respect to the reference direction at the instant mT.
$\theta_e$(mT): Measured azimuth of the aircraft with respect to the reference direction at the instant mT.
$\sigma_e$: Standard deviation of the measurement error committed by the distance ruler The angle θ(t) is linked to the coordinates (x(t), y(t)) in the following manner:

$$\theta(t) = Re(-i\log(x(t) + iy(t)))$$

Where Re designates the real part.

The terms C1, C2 and C3 given as an example are respectively functions of the distance, position data and of the azimuth measurements provided at several instants mT prior to the instant kT for which the corrected position data x(t), y(t) are required. The measurements of distance dn(mT), the position coordinates (x(mT), y(mT)), ($x_I$(mT),$y_I$(mT)) and the azimuth measurements θ(mT), $\theta_e$(mT) having already been determined or measured for the instants prior to t=kT, these terms are assumed to be known for m<k.

Minimizing C(x(t),y(t)) then amounts to minimizing:

$$\Gamma(k) = \sum_{n=1}^{N} w_n(k)\left(\frac{\sqrt{(x(k)-x_n)^2+(y(k)-y_n)^2} - \sqrt{d_n^2(k) - A_Z^2(k)}}{\delta_{maxi}^{ULB}(mT)}\right)^o +$$

$$\left(\frac{\sqrt{(x(k)-x_I(k))^2 + (y(k)-y_I(k))^2}}{\delta_{maxi}^{CI}(k)}\right)^p +$$

$$\left(\frac{(Re(-i\log(x(k)+iy(k))) - \theta_e(k))^2}{\sigma_e^2}\right)^q$$

The solution is obtained as shown below by solving the following system of equations, for example by the Newton-Raphson method:

$$\begin{cases} \frac{\partial \Gamma}{\partial x} = f_x = 0 \\ \frac{\partial \Gamma}{\partial y} = f_y = 0 \end{cases}$$

Alternatively, the altitude of the ground-based receivers zn can be taken into account and the minimization of the cost function can be used to determine the altitude of the aircraft z(t). The cost function can then be written:

$$C(x(t), y(t), z(t)) = \underbrace{C_1(x(t), y(t), z(t))}_{ER\ ULB} + \underbrace{C_2(x(t), y(t))}_{inertial\ unit} + \underbrace{C_3(x(t), y(t))}_{distance\ ruler}$$

With $$C_1(x(kT), y(kT)) = \sum_{m=0}^{k}\sum_{n=1}^{N} w_n(mT) \left(\frac{\sqrt{(x(mT)-x_n)^2 + (y(mT)-y_n)^2 + (z(mT)-z_n)^2} - d_n(mT)}{\delta_{maxi}^{ULB}(mT)}\right)^o$$

Minimizing $C(x(t), y(t), z(t))$ then amounts to minimizing $$\Gamma(k) = \sum_{n=1}^{N} w_n(k)\left(\frac{\sqrt{(x(k)-x_n)^2 + (y(k)-y_n)^2 + (z(k)-z_n)^2} - d_n(k)}{\delta_{maxi}^{ULB}(k)}\right)^o +$$

$$\left(\frac{\sqrt{(x(k)-x_I(k))^2 + (y(k)-y_I(k))^2}}{\delta_{maxi}^{CI}(k)}\right)^p +$$

$$\left(\frac{(\text{Re}(-i\log(x(k)+iy(k))) - \theta_e(k))^2}{\sigma_e^2}\right)^q$$

The solution is obtained as presented below by solving the following system of equations, for example by the Newton-Raphson method:

$$\begin{cases} \frac{\partial \Gamma}{\partial x} = f_x = 0 \\ \frac{\partial \Gamma}{\partial y} = f_y = 0 \\ \frac{\partial \Gamma}{\partial z} = f_z = 0 \end{cases}$$

As in the return navigation assistance phase P1, the corrected position data (x(t), y(t)) obtained by minimization of the cost function, can be filtered using a Kalman filter 17 so as to refine the estimate of the position of the aircraft before using this position to accomplish guidance of the aircraft, and the trajectory tracking module 18 can adapt the state matrix of the filter to take into account the predefined trajectory profile for the aircraft to follow.

The proposed method thus allows positioning of the aircraft with low uncertainty, allowing the aircraft to be guided to the culmination point and to land it, despite the unavailability of satellite positioning and despite the drift of the inertial unit of the aircraft.

The invention claimed is:
1. An automatic assistance method for landing an aircraft on a landing runway from a return point to a culmination point at which the aircraft comes into contact with the landing runway,
   said method being implemented by a data processing device on board said aircraft and configured to be connected to:
      an inertial unit configured to estimate the position and the attitude of the aircraft,
      an altimeter configured to measure the altitude of the aircraft,
      a distance ruler configured to measure, with respect to a reference point, an azimuth of the aircraft with respect to a reference direction,
   wherein said method comprises:
      a return navigation assistance phase comprising guidance (E1, E2), based on position and attitude data provided by the inertial unit and altitude data provided by the altimeter of the aircraft along a predefined trajectory from the return point to a predetermined connection point approximately aligned with the axis of the landing runway, guidance being achieved over at least a portion of said predefined trajectory based on corrected position data calculated using position data of the aircraft provided by the inertial unit and measurements transmitted by the distance ruler, said return navigation assistance phase comprising:
         a first step of guiding the aircraft along the predefined trajectory from the return point to a predetermined capture point, based on position and attitude data provided by the inertial unit and altitude data provided by the altimeter,
         a second step of guiding the aircraft along the predefined trajectory from the capture point to the connection point (C) based on attitude data provided by the inertial unit, altitude data provided by the altimeter and corrected position data calculated using the aircraft position data provided by the inertial unit (5) and azimuth measurements transmitted by the distance ruler, said predefined trajectory imposing a turning movement on the aircraft between the capture point and the connection point,
      a landing assistance phase comprising a guidance of the aircraft from the connection point to the culmination point.
2. The assistance method according to claim 1, wherein the first step of guiding the return navigation assistance phase comprises the guidance of the aircraft along the predefined trajectory from the return point to the capture point based on attitude data provided by the inertial unit, altitude data provided by the altimeter and corrected position data calculated using the aircraft position data provided by the inertial unit and azimuth measurements transmitted by the distance ruler.
3. The assistance method according to claim 1 wherein the predefined trajectory between the return point and the capture point (B) is rectilinear.
4. The assistance method according to claim 2 wherein the predefined trajectory between the return point and the capture point is a zigzag.
5. The assistance method according to claim 1, wherein, the data processing device being configured to also be connected to a camera on board the aircraft, the landing assistance phase comprises the estimation of a position of the culmination point in an image of the landing runway captured by the camera and the estimation of a position of the aircraft depending on said position of the culmination point estimated in the image and altitude data provided by the altimeter.

6. The assistance method according to any claim 1, wherein, the data processing device further being configured to be connected to a transceiver on board said aircraft and designed to receive signals emitted by at least three transceivers positioned on the ground, the landing assistance phase comprises the estimation of corrected position data of the aircraft based on position data provided by the inertial unit, azimuth measurements transmitted by the distance ruler, distance data between the on-board transceiver and said at least three ground-based transceivers.

7. A non-transitory computer program product comprising code instructions which when executed by a processor perform an automatic assistance method for landing an aircraft on a landing runway from a return point to a culmination point at which the aircraft comes into contact with the landing runway,
said method being implemented by a data processing device including said processor on board said aircraft and configured to be connected to:
an inertial unit configured to estimate the position and the attitude of the aircraft,
an altimeter configured to measure the altitude of the aircraft,
a distance ruler configured to measure, with respect to a reference point, an azimuth of the aircraft with respect to a reference direction,
wherein said method comprises:
a return navigation assistance phase comprising guidance (E1, E2), based on position and attitude data provided by the inertial unit and altitude data provided by the altimeter of the aircraft along a predefined trajectory from the return point to a predetermined connection point approximately aligned with the axis of the landing runway, guidance being achieved over at least a portion of said predefined trajectory based on corrected position data calculated using position data of the aircraft provided by the inertial unit and measurements transmitted by the distance ruler, said return navigation assistance phase comprising:
a first step of guiding the aircraft along the predefined trajectory from the return point to a predetermined capture point, based on position and attitude data provided by the inertial unit and altitude data provided by the altimeter,
a second step of guiding the aircraft along the predefined trajectory from the capture point to the connection point (C) based on attitude data provided by the inertial unit, altitude data provided by the altimeter and corrected position data calculated using the aircraft position data provided by the inertial unit (5) and azimuth measurements transmitted by the distance ruler, said predefined trajectory imposing a turning movement on the aircraft between the capture point and the connection point,
a landing assistance phase comprising a guidance of the aircraft from the connection point to the culmination point.

8. A data processing device configured for implementing an automatic assistance method for landing an aircraft on a landing runway from a return point to a culmination point at which the aircraft comes into contact with the landing runway,
said aircraft including said data processing device,
said method being implemented by said data processing device and configured to be connected to:
an inertial unit configured to estimate the position and the attitude of the aircraft,
an altimeter configured to measure the altitude of the aircraft,
a distance ruler configured to measure, with respect to a reference point, an azimuth of the aircraft with respect to a reference direction,
wherein said method comprises:
a return navigation assistance phase comprising guidance (E1, E2), based on position and attitude data provided by the inertial unit and altitude data provided by the altimeter of the aircraft along a predefined trajectory from the return point to a predetermined connection point approximately aligned with the axis of the landing runway, guidance being achieved over at least a portion of said predefined trajectory based on corrected position data calculated using position data of the aircraft provided by the inertial unit and measurements transmitted by the distance ruler, said return navigation assistance phase comprising:
a first step of guiding the aircraft along the predefined trajectory from the return point to a predetermined capture point, based on position and attitude data provided by the inertial unit and altitude data provided by the altimeter,
a second step of guiding the aircraft along the predefined trajectory from the capture point to the connection point (C) based on attitude data provided by the inertial unit, altitude data provided by the altimeter and corrected position data calculated using the aircraft position data provided by the inertial unit (5) and azimuth measurements transmitted by the distance ruler, said predefined trajectory imposing a turning movement on the aircraft between the capture point and the connection point,
a landing assistance phase comprising a guidance of the aircraft from the connection point to the culmination point.

9. A system for automatic assistance with landing of an aircraft on a landing runway comprising:
an inertial unit configured to estimate the position and the attitude of the aircraft,
an altimeter configured to measure the altitude of the aircraft,
a distance ruler configured to measure, with respect to a reference point, the azimuth of the aircraft with respect to a reference direction,
the data processing device according to claim 8.

10. The assistance system according to claim 9, further comprising a camera configured to be connected to the data processing device.

11. The assistance system according to claim 9, further comprising:
at least three transceivers positioned on the ground;
a transceiver designed to receive signals emitted by said at least three transceivers positioned on the ground, on board said aircraft and configured to be connected to the data processing device.

12. The assistance method of claim 1, wherein the data processing device is further configured to be connected to ground-based station via one link "command/control", by radio and bidirectional within a band of the electromagnetic spectrum comprised between 3 and 6 GHz which allows exchange of control and command messages between the ground station and the aircraft and a mission data link, by radio and bidirectional within a band comprised between 10 and 15 GHz of the electromagnetic spectrum, and wherein the predetermined trajectory is selected so that the angular sweep of the aircraft with respect to the ground-based station is greater than 90°.

13. The system of claim 9, further comprising a ground-based station configured to be connected to the data processing device via one link "command/control", by radio and bidirectional within a band of the electromagnetic spectrum comprised between 3 and 6 GHz which allows exchange of control and command messages between the ground station and the aircraft and a mission data link, by radio and bidirectional within a band comprised between 10 and 15 GHz of the electromagnetic spectrum.

* * * * *